(12) United States Patent
Chiang

(10) Patent No.: US 9,729,043 B2
(45) Date of Patent: Aug. 8, 2017

(54) POWER CONVERSION APPARATUS AND PROTECTION METHOD THEREOF WHILE FEEDBACK CURRENT SIGNAL BEING ABNORMAL

(71) Applicant: Power Forest Technology Corporation, Hsinchu County (TW)

(72) Inventor: Yun-Chi Chiang, Hsinchu County (TW)

(73) Assignee: Power Forest Technology Corporation, Hsinchu County (TW)

(*) Notice: Subject to any disclaimer, the term of this patent is extended or adjusted under 35 U.S.C. 154(b) by 82 days.

(21) Appl. No.: 14/548,290

(22) Filed: Nov. 20, 2014

(65) Prior Publication Data

US 2016/0043628 A1  Feb. 11, 2016

(30) Foreign Application Priority Data

Aug. 5, 2014  (TW) .............................. 103126778 A

(51) Int. Cl.
*H02M 3/156* (2006.01)
*H02M 1/32* (2007.01)
(Continued)

(52) U.S. Cl.
CPC .............. *H02M 1/32* (2013.01); *H02M 1/36* (2013.01); *H02M 3/156* (2013.01); *H02M 7/217* (2013.01)

(58) Field of Classification Search
CPC ..... G05F 1/66; G05F 1/40; G05F 1/42; G05F 1/462; G05F 1/52; G05F 1/56; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/158; H02M 3/1588; H02M 2003/1566; H02M 3/1582; H02M 2003/1557; H02M 3/157; H02M 2001/0012; H02M 3/1563;
(Continued)

(56) References Cited

U.S. PATENT DOCUMENTS 6,853,174 B1* 2/2005 Inn ...................... H02M 3/1588
                                                   323/284
8,027,178 B1* 9/2011 Chia .................. H02M 3/33507
                                                   363/56.1
(Continued)

FOREIGN PATENT DOCUMENTS

| TW | 201351857 | 12/2013 |
|----|-----------|---------|
| TW | 201351858 | 12/2013 |
| TW | 201424237 | 6/2014  |

OTHER PUBLICATIONS

"Office Action of Taiwan Counterpart Application," issued on Oct. 15, 2015, p1-p3, in which the listed references were cited.

*Primary Examiner* — Jeffrey Gblende
(74) *Attorney, Agent, or Firm* — Jianq Chyun IP Office

(57) ABSTRACT

A power conversion apparatus and a protection method of the power conversion apparatus while a feedback current signal of the power conversion apparatus is abnormal are provided. The protection method includes a step of stopping switching a power switch if a duty cycle of a pulse width modulation signal is continuously greater than a preset duty cycle for at least one signal cycle and a voltage of a current sensing signal is smaller than a preset voltage level during the at least one signal cycle.

7 Claims, 5 Drawing Sheets

(51) Int. Cl.
*H02M 1/36* (2007.01)
*H02M 7/217* (2006.01)

(58) Field of Classification Search
CPC ......... H02M 2001/0009; H05B 39/048; B23K 11/241; H04B 2215/069
See application file for complete search history.

(56) References Cited

U.S. PATENT DOCUMENTS

| | | | |
|---|---|---|---|
| 2004/0070906 A1* | 4/2004 | Kohout | H02M 3/1588 361/92 |
| 2012/0074917 A1* | 3/2012 | Chao | H02M 3/155 323/282 |
| 2012/0147630 A1* | 6/2012 | Cao | H02H 3/006 363/21.15 |
| 2014/0125303 A1* | 5/2014 | Dagan | H02M 3/156 323/282 |
| 2014/0268925 A1* | 9/2014 | Lee | H02M 3/33507 363/21.18 |

* cited by examiner

POWER CONVERSION APPARATUS AND PROTECTION METHOD THEREOF WHILE FEEDBACK CURRENT SIGNAL BEING ABNORMAL

CROSS-REFERENCE TO RELATED APPLICATION

This application claims the priority benefit of Taiwan application serial no. 103126778, filed on Aug. 5, 2014. The entirety of the above-mentioned patent application is hereby incorporated by reference herein and made a part of this specification.

BACKGROUND

Field of the Invention

The invention relates to an electronic device, and particularly relates to a power conversion apparatus and a protection method thereof while a feedback current signal of the power conversion apparatus is abnormal.

Description of Related Art

According to the related art, a power conversion apparatus is mainly used for converting an alternating current (AC) input voltage provided by a power company into a direct current (DC) output voltage suitable for use by different electronic devices. Thus, the power conversion apparatuses are widely used in computers, office automation devices, industrial control devices, communication devices, and other electronic apparatuses.

The conventional power conversion apparatus employs a current sensing pin of a pulse width modulation (PWM) control chip to sense the voltage at a common node between a power switch and a current sensing resistor and thereby adjusts the conduction state of the power switch accordingly, so as to protect the power conversion apparatus from overcurrent. However, when a short circuit occurs at the common node between the power switch and current sensing resistor, the PWM control chip is unable to detect the voltage at the common node between the power switch and the current sensing resistor, and thus the maximum duty cycle is applied to switch the power switch, which forces the power conversion apparatus to continuously output the abnormally large amount of current. As a result, the power conversion apparatus or internal components of the power conversion apparatus are more susceptible to damages.

SUMMARY OF THE INVENTION

The invention provides a power conversion apparatus and a protection method thereof while a feedback current signal of the power conversion apparatus is abnormal, so as to solve the issues provided in the related art.

In an embodiment of the invention, a power conversion apparatus includes a power conversion circuit, a current sensing unit, and a control chip. The power conversion circuit is configured to convert an input voltage to an output voltage. Here, the power conversion circuit has a power switch, and a control terminal of the power switch receives a PWM signal. According to the PWM signal, a conduction state of the power switch is switched by the power switch, so as to convert the input voltage to an output voltage. The current sensing unit is coupled to the power switch, and the current sensing unit senses the current flowing through the power switch and outputs a current sensing signal. The control chip is coupled to the power conversion circuit and the current sensing unit, and the control chip outputs the PWM signal according to the current sensing signal. If a duty cycle of the PWM signal is continuously greater than or equal to a preset duty cycle for at least one signal cycle, the current flowing through the power switch should be greater than a certain value; at this time, if the voltage of the current sensing signal is less than a preset voltage, it indicates that the feedback current signal is abnormal, and the control chip then stops switching the power switch to protect the power conversion circuit.

According to an embodiment of the invention, the current sensing unit includes a current sensing resistor coupled between the power switch and a ground.

According to an embodiment of the invention, the power conversion circuit further includes an inductor, a rectifier diode, a first capacitor, and a second capacitor. The inductor is coupled between the input voltage and the power switch. An anode of the rectifier diode is coupled to a common node of the inductor and the power switch, and a cathode of the rectifier is coupled to an output end of the power conversion circuit. The first capacitor is coupled between the input voltage and a ground. The second capacitor is coupled between the cathode of the rectifier diode and the ground.

According to an embodiment of the invention, the power conversion apparatus further includes a feedback unit coupled to the output voltage and the control chip, and the feedback unit outputs a feedback signal to the control chip according to the output voltage. If the voltage of the feedback signal is greater than a reference voltage, the control chip switches off the power switch.

According to an embodiment of the invention, the power switch is an N-type transistor.

In an embodiment of the invention, when a feedback current signal of a power conversion apparatus is abnormal, a protection method of the power conversion apparatus includes following steps. A current sensing signal is generated according to the current flowing through the power switch. Whether a duty cycle of a PWM signal is continuously greater than or equal to a preset duty cycle for at least one signal cycle is determined, and whether the voltage of the current sensing signal is smaller than a preset voltage level during the at least one signal cycle is determined. If the duty cycle of the PWM signal is continuously greater than or equal to the preset duty cycle for the at least one signal cycle, and if the voltage of the current sensing signal is smaller than the preset voltage during the at least one signal cycle, the protection method includes a step of stopping switching the power switch to protect the power conversion circuit.

According to an embodiment of the invention, the preset duty cycle is the maximum duty cycle of the PWM signal.

According to an embodiment of the invention, the protection method further includes steps of generating a feedback signal according to the output voltage, determining whether the voltage of the feedback signal is greater than a reference voltage, and stopping the power switch if the voltage of the feedback signal is greater than the reference voltage.

Based on the above, in the embodiments of the invention, if the duty cycle of the PWM signal is continuously greater than the preset duty cycle for at least one signal cycle, and if the voltage of the current sensing signal is smaller than the preset voltage during the at least one signal cycle, switching of the power switch is stopped, so as to prevent the control chip from continuously switching the power switch according to the PWM signal characterized by the high duty cycle, and prevent the power conversion apparatus or its internal components coupled to the load of the power conversion apparatus from being damaged.

In order to make the above features and advantages of the invention clearer and easier to understand, embodiments will be described in details below with the accompanying drawings.

DETAILED DESCRIPTION OF DISCLOSED EMBODIMENTS

Figure 1:
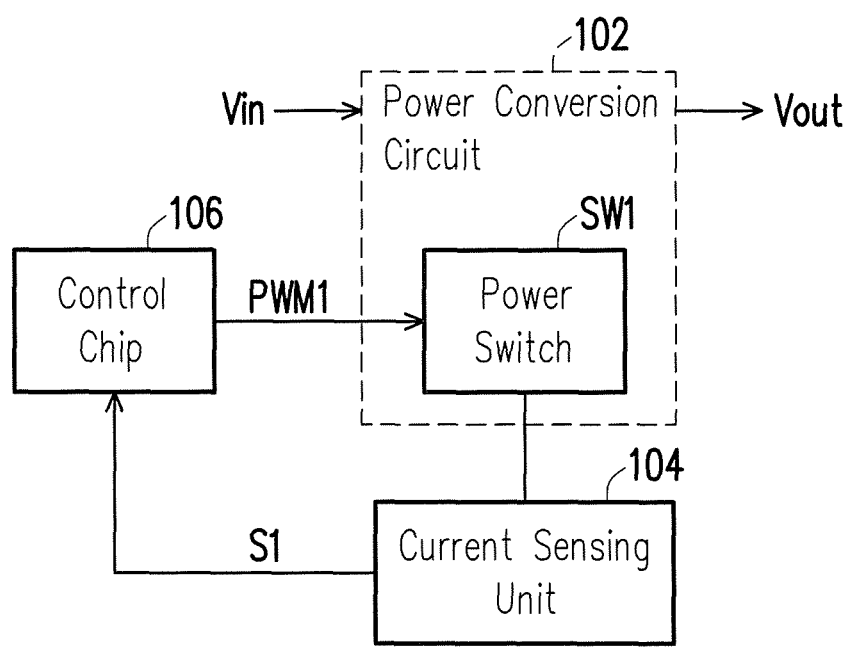
FIG. 1 is a schematic diagram illustrating a power conversion apparatus according to an embodiment of the invention.

FIG. 1 is a schematic diagram illustrating a power conversion apparatus according to an embodiment of the invention. As shown in FIG. 1, the power conversion apparatus includes a power conversion circuit 102, a current sensing unit 104, and a control chip 106. The control chip 106 is coupled to the power conversion circuit 102 and the current sensing unit 104, and the power conversion circuit 102 is coupled to the current sensing unit 104. The power conversion circuit 102 can convert an input voltage Vin to an output voltage Vout, and the power conversion circuit 102 may, for example, be a boost circuit, which should however not be construed as a limitation to the invention. Specifically, the power conversion circuit 102 has a power switch SW1, and a control terminal of the power switch SW1 is configured to receive a PWM signal PWM1 from the control chip 106; according to the PWM signal PWM1, the conduction state of the power switch is switched, so as to convert the input voltage Vin to the output voltage Vout.

While the power switch SW1 executes switching, the current sensing unit 104 can sense the current flowing through the power switch SW1 and produce a current sensing signal S1. The control chip 106 can then alter the PWM signal PWM1 according to whether the current sensing signal S1 reaches an overcurrent protection level and switch off the power switch SW1 for overcurrent protection. For example, when the current flowing through the power switch SW1 increases, the voltage level of the current sensing signal S1 is raised, and the control chip 106 can continue to maintain the original duty cycle of the PWM signal PWM1 while the current sensing signal S1 does not reach the overcurrent protection level. On the contrary, if the voltage level of the current sensing signal S1 exceeds the overcurrent protection level, the control chip 106 changes the duty cycle of the PWM signal PWM1 to achieve the function of overcurrent protection.

Figure 2A:
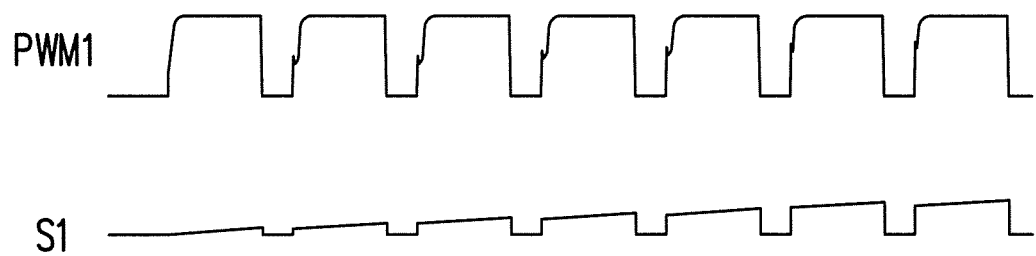
FIG. 2A is a schematic diagram illustrating waveforms of a PWM signal and a current sensing signal of a conventional power conversion apparatus.

Additionally, the control chip 106 further determines whether a duty cycle of a PWM signal PWM1 is continuously greater than or equal to a preset duty cycle for at least one signal cycle and whether the voltage of the current sensing signal S1 is smaller than a preset voltage level during the at least one signal cycle. If the duty cycle of the PWM signal PWM1 is continuously greater than or equal to the preset duty cycle for the at least one signal cycle, and if the voltage of the current sensing signal S1 is smaller than the preset voltage level during the at least one signal cycle, the feedback current signal is deemed abnormal, and the control chip 106 stops outputting the PWM signal PWM1 to the power switch SW1 and stops switching the power switch SW1, such that the power conversion apparatus enters the protection mode. Thereby, in case of the voltage of the abnormal current sensing signal S1, i.e., when the PWM signal PWM1 has the large duty cycle and when the voltage of the current sensing signal S1 is smaller than the preset voltage, the control chip 106 can be prevented from continuously switching the power switch SW1 (as shown in FIG. 2A) according to the PWM signal PWM1 characterized by the high duty cycle (as provided in the related art), and possible damages to the power conversion apparatus (for example, the power switch SW1) or internal components coupled to the load of the power conversion apparatus can be prevented as well.

Figure 2B:
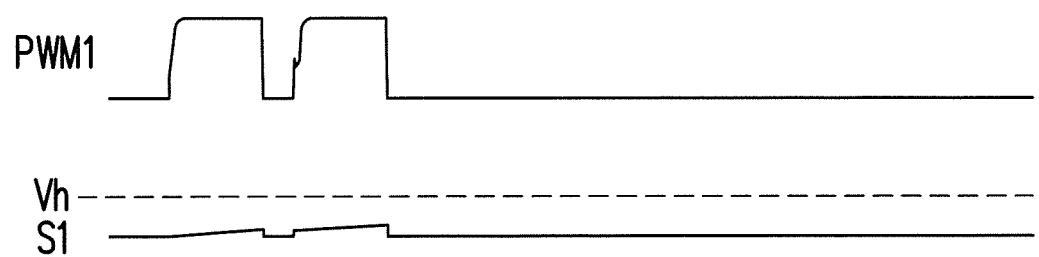
FIG. 2B is a diagram illustrating waveforms of a PWM signal and a current sensing signal of a power conversion apparatus according to an embodiment of the invention.

For example, FIG. 2B is a diagram illustrating waveform as of a PWM signal and a current sensing signal of a power conversion apparatus according to an embodiment of the invention. As shown in FIG. 2B, in the present embodiment, the control chip 106 senses whether the duty cycle of the PWM signal PWM1 is greater than or equal to a preset duty cycle for more than two signal cycles (i.e., in the present embodiment the preset duty cycle is set to be the maximum duty cycle of the PWM signal PWM1) and whether the voltage of the current sensing signal S1 is smaller than a preset voltage Vh for the two signal cycles. As is shown in FIG. 2B, in the present embodiment, the duty cycle of the PWM signal PWM1 is equal to the maximum duty cycle during the entirety of two consecutive signal cycles, and the voltage of the current sensing signal S1 is smaller than the preset voltage Vh during the same period. Therefore, after the two signal cycles are over, the control chip 106 stops outputting the PWM signal PWM1 and disables the power switch SW1. As such, if the voltage of the current sensing signal S1 output by the current sensing unit 104 cannot be pulled high because of short circuits or for any other reason, the control chip 106 can be prevented from continuously switching the power switch SW1 according to the PWM signal PWM1 characterized by the high duty cycle, as shown in FIG. 2A, and damages to the power conversion apparatus (for example, the power switch SW1) or internal components coupled to the load of the power conversion apparatus can be prevented as well.

Note that the aforesaid preset duty cycle is not limited to the maximum duty cycle of the PWM signal PWM1, and in other embodiments the preset duty cycle can be set to a smaller duty cycle, for example, 50% or 60% of the duty cycle described herein. Additionally, the number of signal cycles during which whether the duty cycle of the PWM signal PWM1 is greater than or equal to the preset duty cycle and whether the voltage of the current sensing signal S1 is all smaller than the preset voltage are observed is not limited to 2; in some embodiments of the invention, the observation period can be extended, and more signal cycles may be spent on determining whether to disable the power switch SW1.

Figure 3:
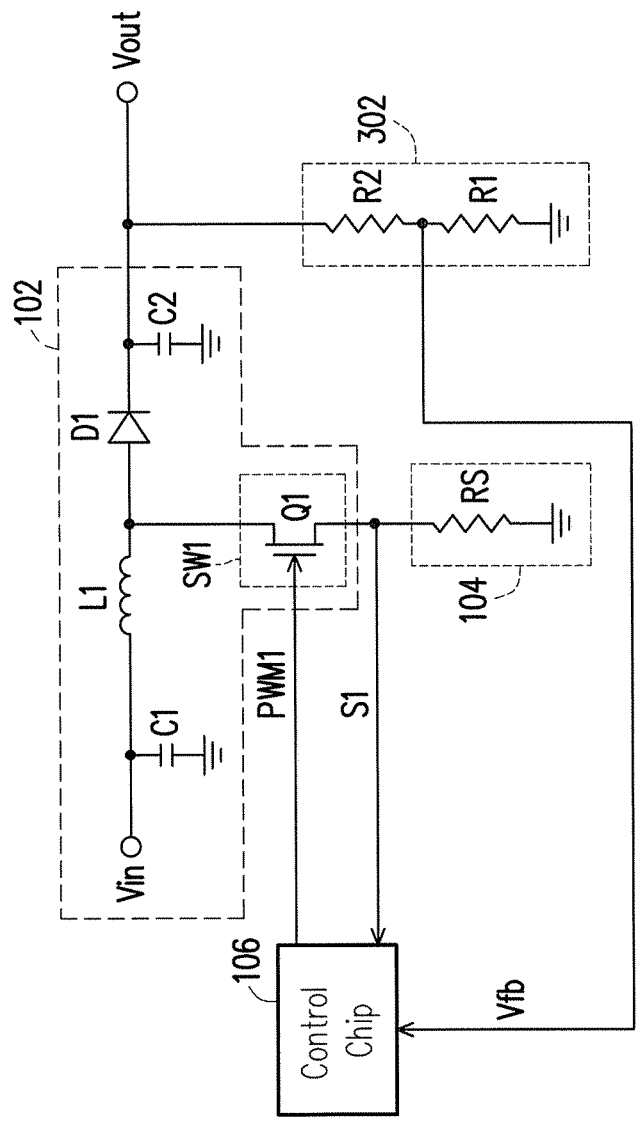
FIG. 3 is a schematic diagram illustrating a power conversion apparatus according to another embodiment of the invention.

FIG. 3 is a schematic diagram illustrating a power conversion apparatus according to another embodiment of the invention. As shown FIG. 3, in the present embodiment, the current sensing unit 104 is implemented in form of a current sensing resistor Rs, where the current sensing resistor Rs is coupled between the power switch SW1 and the ground, and the power switch SW1 is then implemented in form of an N-type transistor Q1. Additionally, the power conversion circuit 102 further includes an inductor L1, a rectifier diode D1, a capacitor C1, and a capacitor C2. The inductor L1 is coupled between the input voltage Vin and the power switch SW1, the anode and the cathode of the rectifier diode D1 are respectively coupled to a common node of the inductor L1 and the power switch SW1 and the output end of the power conversion circuit 102, the capacitor C1 is coupled between the input voltage Vin and the ground, and the capacitor C2 is coupled between the output voltage Vout and the ground.

In the present embodiment, the voltage of the current sensing resistor Rs (namely the voltage of the current sensing signal S1) can reflect the magnitude of the current flowing through the transistor Q1 (namely the power switch SW1). The control chip 106 controls the duty cycle of its output PWM signal PWM1 according to the voltage of the current sensing resistor Rs, so as to switch the conduction state of the transistor Q1 and to achieve overcurrent protection. Similarly, as exemplarily shown by the waveform in FIG. 2B, when the voltage of the current sensing resistor Rs is pulled low due to short circuits, the control chip 106 increases the duty cycle of PWM signal PWM1, and when the control chip 106 detects that the duty cycle of the PWM signal PWM1 is continuously greater than or equal to a preset duty cycle for two signal cycles, and the voltage of the current sensing signal S1 is not pulled up to be greater than or equal to a preset voltage Vh during these two signal cycles, the control chip 106 stops outputting the PWM signal PWM1 and disables the power switch SW1.

Additionally, the power conversion apparatus in the present embodiment further includes a feedback unit 302, where the feedback unit 302 can provide another mechanism to disable the power switch SW1. The feedback unit 302 is coupled to the output voltage Vout and the control chip 106. The feedback unit 302 can output the feedback signal Vfb to the control chip 106 according to the output voltage Vout, and the control chip 106 can determine whether the voltage of the feedback signal Vfb is greater than a reference voltage, and if the voltage of feedback signal Vfb is greater than the reference voltage, then switch off the power switch SW1. The feedback unit 302 in the present embodiment is implemented in form of resistors R1 and R2, which should however not be construed as a limitation to the invention. The resistors R1 and R2 are connected in series between the output voltage Vout and the ground, and the feedback signal Vfb is the voltage at a common node of the resistors R1 and R2.

Figure 4:
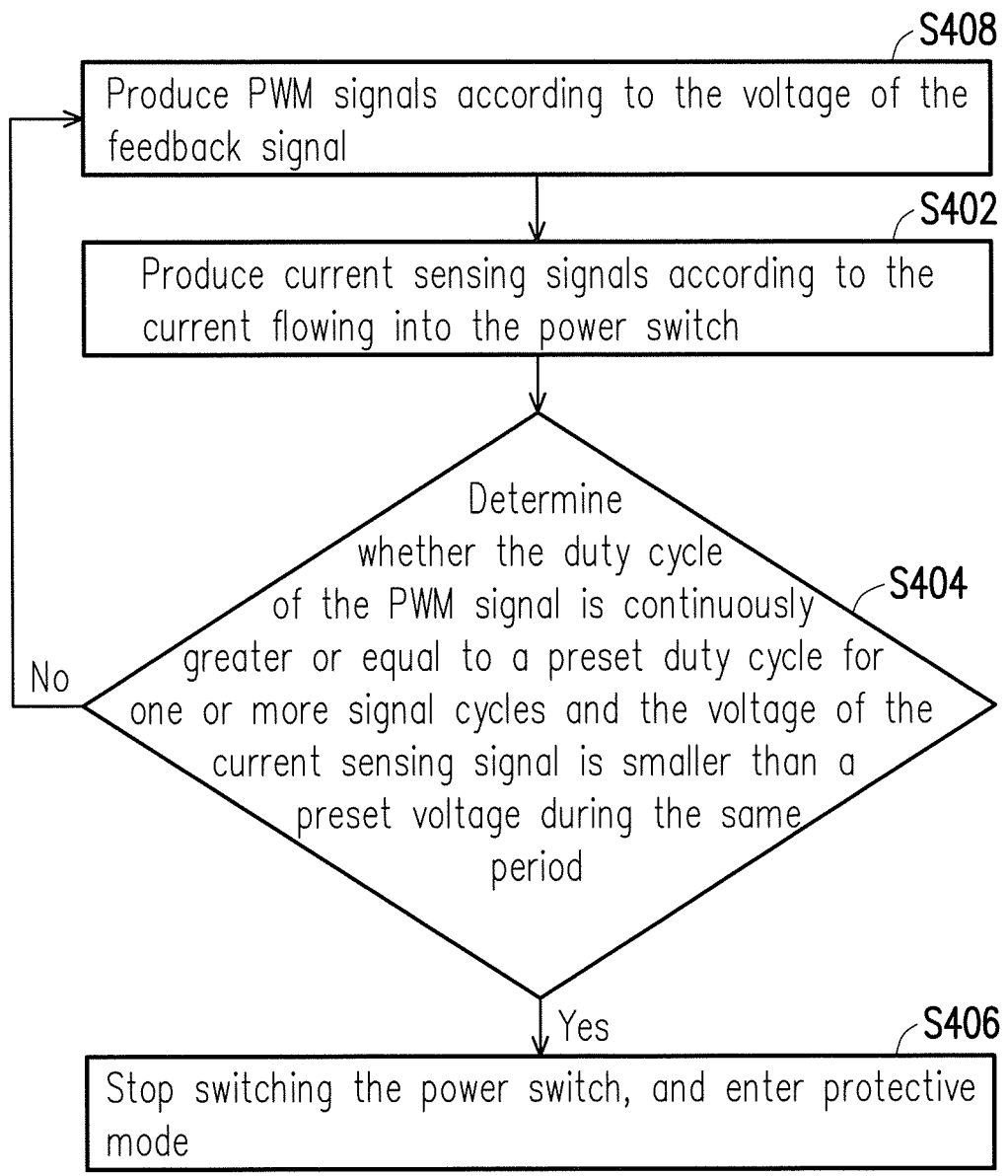
FIG. 4 is a flow chart of a protection method of a power conversion apparatus while a feedback current signal of the power conversion apparatus is abnormal according to an embodiment of the invention.

FIG. 4 is a flow chart of a protection method of a power conversion apparatus while a feedback current signal of the power conversion apparatus is abnormal according to an embodiment of the invention. With reference to FIG. 4, as provided in the previous embodiments, the protection method of a power conversion apparatus while a feedback current signal of the power conversion apparatus is abnormal includes following steps. A current sensing signal is generated according to the current flowing through the power switch (step S402). Next, whether the duty cycle of the PWM signal is continuously greater than or equal to a preset duty cycle for at least one signal cycle is determined, and whether the voltage of the current sensing signal is smaller than a preset voltage during the at least one signal cycle is determined (step S404), wherein the preset duty cycle is the maximum duty cycle of the PWM signal (which should however not be construed as a limitation to the invention). If the duty cycle of the PWM signal is continuously greater than or equal to a preset duty cycle for at least one signal cycle, and the voltage of the current sensing signal is smaller than a preset voltage during the same at least one signal cycle, stop switching the power switch, such that the power conversion apparatus enters a protection mode (step S406). On the contrary, if the duty cycle of the PWM signal is smaller than the preset duty cycle, or if the duty cycle of the PWM signal is greater than or equal to the preset duty cycle but the voltage of the current sensing signal is greater than a preset voltage during the same period, then go back to step S408 and generate the PWM signal according to the voltage of the feedback signal. After that, in step S402, the current sensing signal is generated according to the current flowing through the power switch.

Figure 5:
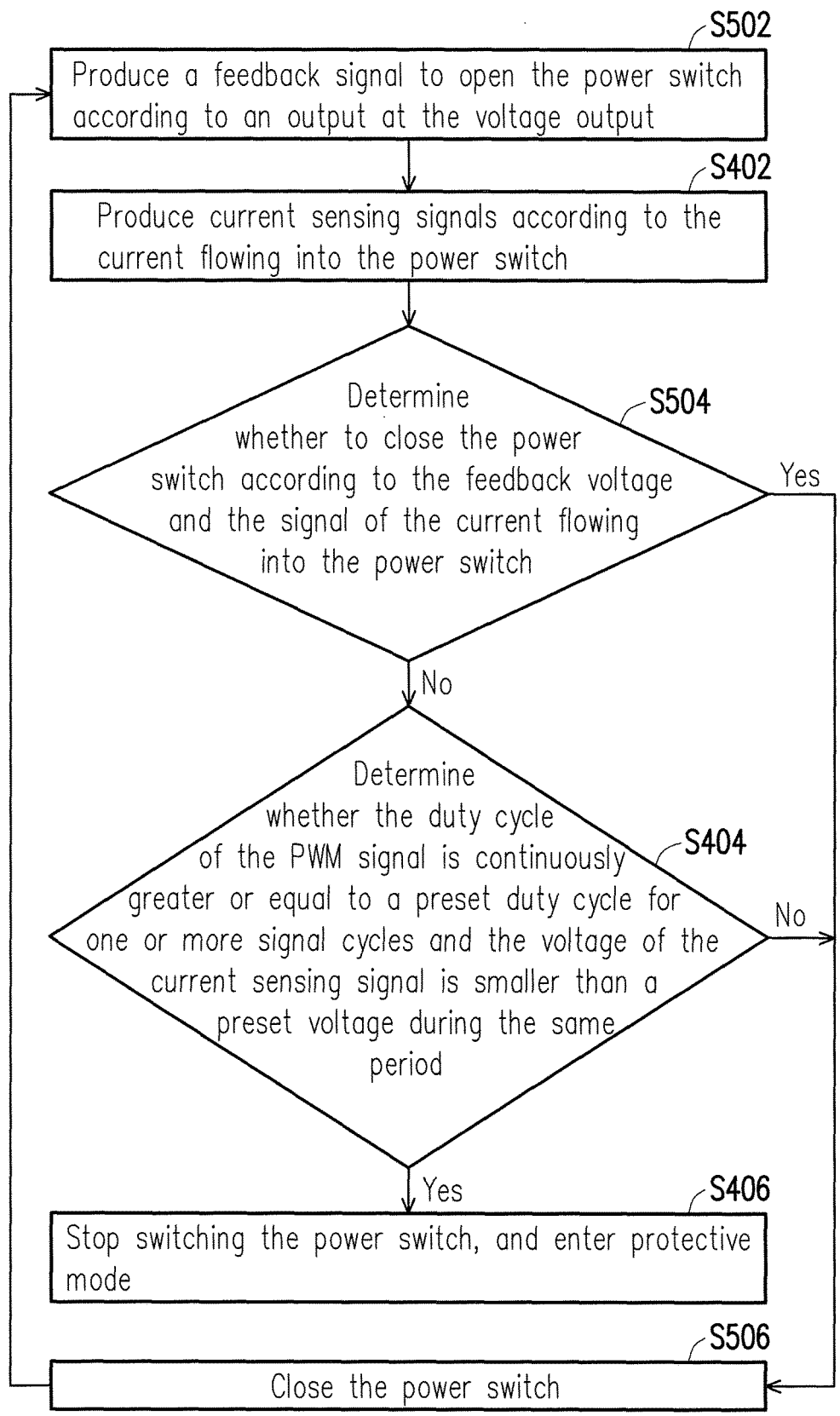
FIG. 5 is a flow chart of a protection method of a power conversion apparatus while a feedback current signal of the power conversion apparatus is abnormal according to another embodiment of the invention.

FIG. 5 is a flow chart of a protection method of a power conversion apparatus while a feedback current signal of the power conversion apparatus is abnormal according to another embodiment of the invention. With reference to FIG. 5, in the present embodiment, the protection method of a power conversion apparatus while the feedback current signal of the power conversion apparatus is abnormal further includes the step of producing a feedback signal to switch on the power switch according to an output voltage (Vout) (step S502). In step S402, the current sensing signal is generated according to the current flowing through the power switch, and whether to switch off the power switch is determined according to the feedback voltage and the signal of the current flowing through the power switch (step S504). If the conditions for switching off the power switch are met, go to step S506 and switch off the power switch and then return to step S502 to generate a feedback signal according to the voltage output (Vout), so as to switch on the power switch and enter the next signal cycle. On the other hand, the power switch stays on, and step S404 is then performed. In the present embodiment, if it is determined in step S404 that the duty cycle of the PWM signal is smaller than a preset duty cycle, or if the duty cycle of the PWM signal is greater than or equal to the preset duty cycle for at least one signal cycle but the voltage of the current sensing signal is greater than a preset voltage during the at least one signal cycle, the power switch is switched off (step S506), step S502 is again performed to enter the next signal cycle. On the contrary, if the duty cycle of the PWM signal is continuously greater than or equal to the preset duty cycle for at least one signal cycle and the voltage of the current sensing signal is smaller than the preset voltage during the at least one signal cycle, stop switching the power switch and enter the protection mode (step S406).

To sum up, according to the embodiments of the invention, if the duty cycle of the PWM signal is continuously greater than the preset duty cycle for at least one signal cycle, and if the voltage of the current sensing signal is smaller than the preset voltage during the at least one signal cycle, the control chip is prevented from continuously switching the power switch according to the PWM signal characterized by the high duty cycle to enter the protection mode, and possible damages to the power conversion apparatus or the internal components coupled to the load the power conversion apparatus can be prevented as well.

What is claimed is:

1. A power conversion apparatus comprising:
a power conversion circuit configured to convert an input voltage to an output voltage, the power conversion circuit having a power switch, a control terminal of the power switch receiving a pulse width modulation signal, a conduction state of the power switch being switched according to the pulse width modulation signal, so as to convert the input voltage to the output voltage;
a current sensing unit coupled to the power switch, the current sensing unit sensing a current flowing through the power switch and outputting a current sensing signal; and
a control chip coupled to the power conversion circuit and the current sensing unit, the control chip outputting the pulse width modulation signal according to the current sensing signal, wherein when a duty cycle of the pulse width modulation signal is greater than or equal to a preset duty cycle for two or more consecutive signal cycles and a voltage of the current sensing signal is smaller than a preset voltage during the two or more consecutive signal cycles, the control chip stops switching the power switch, such that the power conversion apparatus enters a protection mode.

2. The power conversion apparatus as claimed in claim 1, wherein the current sensing unit comprises:
a current sensing resistor coupled between the power switch and a ground.

3. The power conversion apparatus as claimed in claim 1, wherein the preset duty cycle is a maximum duty cycle of the pulse width modulation signal.

4. The power conversion apparatus as claimed in claim 1, wherein the power conversion circuit further comprises:
an inductor coupled between the input voltage and the power switch;
a rectifier diode, an anode of the rectifier diode being coupled to a common node of the inductor and the power switch, a cathode of the rectifier diode being coupled to an output end of the power conversion circuit;
a first capacitor coupled between the input voltage and a ground; and
a second capacitor coupled between the cathode of the rectifier diode and the ground.

5. The power conversion apparatus as claimed in claim 1, wherein the power switch is an N-type transistor.

6. A protection method of a power conversion apparatus while a feedback current signal of the power conversion apparatus is abnormal, wherein the power conversion apparatus has a power switch, a conduction state of the power switch is switched by the power switch according to a pulse width modulation signal, so as to convert an input voltage received by the power conversion apparatus to an output voltage, the protection method comprising:
generating a current sensing signal according to a current flowing through the power switch;
determining whether a duty cycle of the pulse width modulation signal is greater than or equal to a preset duty cycle for two or more consecutive signal cycles and whether a voltage of the current sensing signal is smaller than a preset voltage during the two or more consecutive signal cycles; and
if the duty cycle of the pulse width modulation signal is greater than the preset duty cycle for the two or more consecutive signal cycles and the voltage of the current sensing signal is smaller than the preset voltage during the two or more consecutive signal cycles, stop switching the power switch, such that the power conversion apparatus enters a protection mode.

7. The protection method as claimed in claim 6, wherein the preset duty cycle is a maximum duty cycle of the pulse width modulation signal.

* * * * *